United States Patent
Carey

(10) Patent No.: US 7,110,675 B2
(45) Date of Patent: Sep. 19, 2006

(54) METHODS OF OPTICAL COMMUNICATION AND OPTICAL COMMUNICATION SYSTEMS

(75) Inventor: Kent W. Carey, Palo Alto, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 722 days.

(21) Appl. No.: 09/961,119

(22) Filed: Sep. 20, 2001

(65) Prior Publication Data

US 2003/0053180 A1    Mar. 20, 2003

(51) Int. Cl.
*H04J 14/02* (2006.01)

(52) U.S. Cl. .............. 398/90; 398/82; 398/87

(58) Field of Classification Search .......... 398/90, 398/82, 87
See application file for complete search history.

(56) References Cited

U.S. PATENT DOCUMENTS

| | | | | |
|---|---|---|---|---|
| 5,526,155 A | * | 6/1996 | Knox et al. ........... | 398/87 |
| 5,861,965 A | * | 1/1999 | Koren et al. .......... | 398/75 |
| 5,936,752 A | * | 8/1999 | Bishop et al. ......... | 398/90 |
| 6,313,932 B1 | * | 11/2001 | Roberts et al. ........ | 398/9 |
| 6,341,021 B1 | * | 1/2002 | Wilner et al. .......... | 398/79 |
| 6,366,356 B1 | * | 4/2002 | Brosnan et al. ........ | 356/477 |
| 6,421,154 B1 | * | 7/2002 | Diels et al. ........... | 398/182 |

OTHER PUBLICATIONS

"Optically Coherent Direct Modulated FM Analog Link with Phase Noise Canceling Circuit"; Robert Taylor et al.; Journal of Lightwave Technology, vol. 17, No. 4; Apr. 1999; pp. 556-563.

"Influence of Adjacent Channel Interference on th eFrequency-Modulated WDM Optical Communication System"; Madhumita Bhattacharya et al.; vol. 17, No. 12; Dec. 1999; pp. 2516-2519.

"Amplitude-modulation-free Optoelectronic Frequency Control of Laser Diodes" B. Bodermann et al.; Optical Letters, vol. 25, No. 12; Jun. 15, 2000; pp. 899-901.

"Design and Performance of a Narrowband VCO at 282 THz"; Peter R. Robrish et al.; Hewlett-Packard Journal; Feb. 1995; pp. 63-66.

* cited by examiner

*Primary Examiner*—David C. Payne

(57) ABSTRACT

Methods of optical communication and optical communication systems are described. According to a first aspect, a method of optical communication includes providing an optical signal and providing a plurality of data signals. This aspect also includes passing a plurality of desired portions of the optical signal using a plurality of respective optical modulators, the desired portions individually having at least one predefined wavelength. The method also includes optically modulating the desired portions of the optical signal using the respective optical modulators and responsive to respective ones of the data signals and outputting the desired portions of the optical signal to an optical communication medium after the modulating.

31 Claims, 2 Drawing Sheets

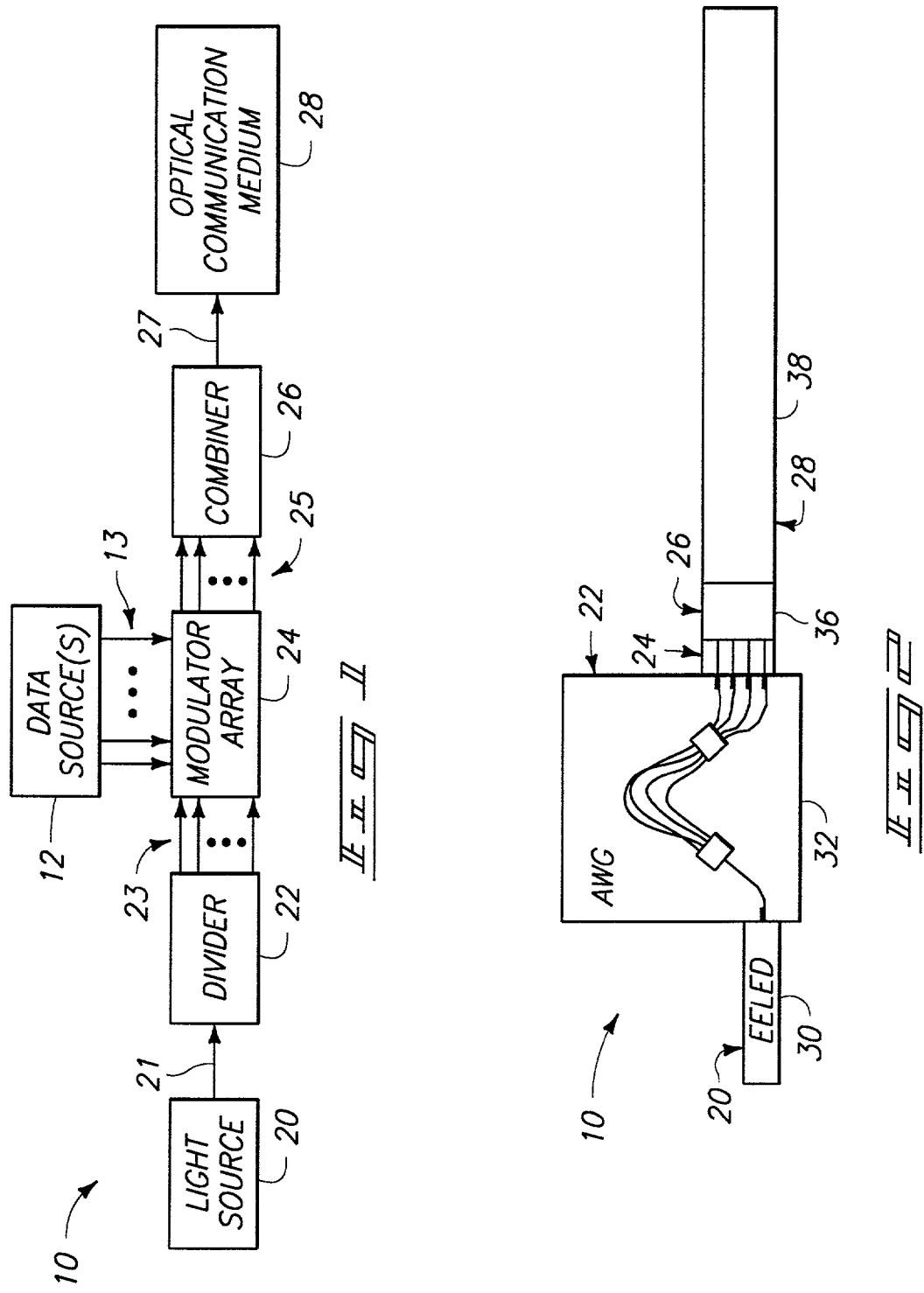

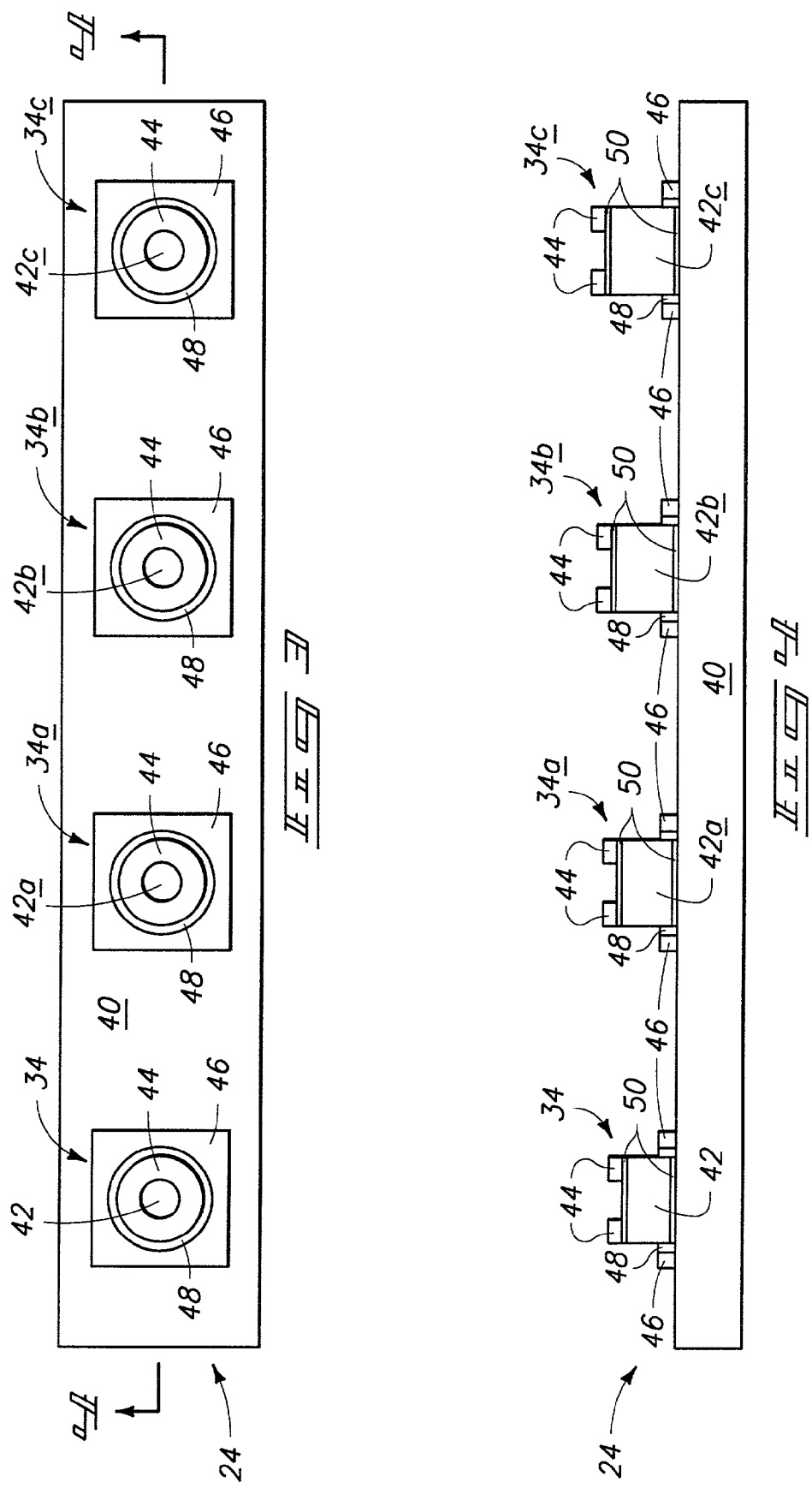

METHODS OF OPTICAL COMMUNICATION AND OPTICAL COMMUNICATION SYSTEMS

TECHNICAL FIELD

The invention relates to methods of optical communication and optical communication systems.

BACKGROUND OF THE INVENTION

The amount of information communicated within networks, such as voice and data networks, has increased dramatically in recent years. Accordingly, such has resulted in demands for increased bandwidth in networks to communicate more information at increased rates of data transfer. As the demands for bandwidth of data communications continues to increase, improved devices and methodologies to accommodate the demands are desired.

One example of data transmission technology uses low power, high data rate and wavelength division multiplexing to achieve high bit rate data transmission. An exemplary implementation utilizes a relatively large number of optical sources at different wavelengths. However, such configurations can be relatively difficult to fabricate and relatively expensive to package.

Another solution has been to directly modulate light sources, such as laser diodes. However, the rate of modulation within such systems is less than desirable to accommodate the increasing bandwidth demands.

More specifically, conventional fiber optic communications systems typically rely on a separate source for each optical wavelength used in a wavelength division multiplexed system. However, as more and more optical wavelengths are used, larger numbers of active devices must be packaged in transmitter modules. Removing the heat from these devices constrains the package design and complicates the ability to inject high speed data signals into the devices. Also, since the optical sources are typically laser diodes, the performance of the sources varies significantly over temperature. In addition, data is encoded on each optical signal by modulation of the optical intensity at that wavelength.

Accordingly, there exists a need for an improved approach to generating frequency multiplexed optical signals.

SUMMARY OF THE INVENTION

Aspects of the present invention provide for multiplexing individually modulated components of a source light. A broad-spectrum light source provides the source light; an optical divider divides the source light into plural carrier beams. A multi-channel modulator modulates each carrier beam responsive to a respective data signal to yield a respective encoded beam. An optical combiner multiplexes the encoded beams. The optical combiner can also inject the multiplexed signal into a communication medium for reception elsewhere.

According to a realization of the present invention, the optical combiner frequency multiplexes the encoded beams. To this end, the encoded beams can have different wavelengths. The differences in wavelengths can be imposed originally by an optical divider as it generates carrier beams having different wavelengths. Alternatively, the carrier wavelengths need not differ; instead, the modulator itself causes the encoded beams to have different wavelengths.

According to additional exemplary aspects, optical modulators pass a desired portion of a received optical signal having at least one predefined wavelength. The modulators optically modulate the desired portion of the optical signal having the at least one predefined wavelength responsive to a respective data signal.

Additional aspects of the invention disclose methods which include passing a plurality of desired portions of an optical signal using a plurality of respective optical modulators. The desired portions of the signal individually have at least one predefined wavelength. The method also includes optically modulating the desired portions of the optical signal using the respective optical modulators responsive to data signals. In one exemplary implementation, the optically modulating is implemented using frequency modulation.

As is apparent from the foregoing, the present invention has both method and structural aspects. By using a single broadband light source for the multiple components of a multiplexed signal, the present invention overcomes many of the problems faced by prior art systems that use multiple light sources. It much easier and more cost-effective to manufacture a single broad-spectrum light source than multiple single-frequency light sources. Furthermore, more channels can be implemented without encountering heat-dissipation limits. Also, since the light source is not modulated, switching speed limitations associated with modulating a light source directly are not encountered. More specifically, aspects of the invention disclose arrangements and methodologies wherein signal bandwidths are limited by the response of the modulator which can be much faster than the bandwidth of a laser. Certain embodiments of the invention provide other advantages in addition to or in lieu of the advantages described above, as is apparent from the description below with reference to the following drawings.

BRIEF DESCRIPTION OF THE DRAWINGS

Preferred embodiments of the invention are described below with reference to the following accompanying drawings depicting examples embodying the best mode for practicing the invention.

FIG. 1 is a functional block diagram of an exemplary optical communication system.

FIG. 2 is an illustrative representation of one exemplary implementation of the optical communication system depicted in FIG. 1.

FIG. 3 is a top view of an array of exemplary optical modulators.

FIG. 4 is a cross-sectional view of the array shown in FIG. 3.

DETAILED DESCRIPTION OF THE INVENTION

Referring to FIG. 1, an exemplary optical communication system 10 is illustrated. The depicted optical communication system 10 includes one or more data source 12, a light source 20, an optical divider 22, an optical modulator array 24 and an optical combiner 26. Light source 20, optical divider 22, optical modulator array 24, optical combiner 26 and optical communication medium 28 are optically coupled with one another.

Light source 20 is configured as a broad spectrum optical source in the described exemplary embodiment. For example, light source 20 is configured as an edge emitting light emitting diode (EELED) configured to emit a broad spectrum optical signal 21, also referred to as a source-light beam, having a plurality of wavelengths. In the described exemplary arrangement, broad spectrum optical signal 21 is approximately 200 nm wide. Other configurations of light source 20 configured to emit other optical signals are possible.

The light of broad spectrum optical signal 21 is provided to an optical divider 22. Optical divider 22 divides the light of the broad spectrum optical signal 21 into a plurality of optical signals 23, also referred to as carrier light-beams. In exemplary arrangements, optical divider 22 is configured as a beam splitter, array waveguide (AWG), prism or other wavelength dispersive element.

Optical signals 23 outputted from optical divider 22 have respective different portions or segments of the wavelength spectrum of broad spectrum optical signal 21. In one exemplary arrangement, optical signals 23 individually comprise a portion of optical signal 21 having one or more respective different wavelength than the other optical signals 23 as determined by optical divider 22.

According to aspects of the invention, the number of channels within optical communication system 10 is determined by the number of optical signals 23 outputted from optical divider 22. According to one exemplary embodiment of the present invention, individual channels correspond to respective different wavelengths of optical signal 21. The number of optical signals 23 generated by optical divider 22 may be varied according to the desired implementation of optical communication system 10.

Optical modulator array 24 comprises a plurality of optical modulators (exemplary optical modulators are described below with respect to references 34, 34a, 34b, 34c illustrated in FIGS. 3 and 4). Such optical modulators within array 24 are individually configured to pass a desired portion of the optical signal 21 and to optically modulate the desired portion of the optical signal 21 for encoding data thereon. In the embodiment illustrated in FIG. 1, desired portions of optical signal 21 correspond to respective optical signals 23 as described in further detail below.

According to aspects of the present invention, optical modulators of array 24 are configured to implement frequency modulation of the respective desired portions of optical signal 21. Alternatively, amplitude modulation or other modulation schemes may be utilized to encode data upon the portions 23 of optical signal 21.

Depending upon the configuration of optical communication system 10 shown in FIG. 1 or provided in other arrangements, optical modulators of array 24 also operate to filter undesired portions of optical signal 21 or optical signals 23. Individual optical modulators of optical modulator array 24 have passbands configured to pass and to modulate light within a desired portion (passing light having one or more predefined wavelength) and to filter light within undesired portions (at other wavelengths outside of the respective passbands of the optical modulators). For example, optical modulators of optical modulator array 24 are individually configured to pass and modulate a portion of optical signal 21 within the respective passband and to not pass or modulate portions of optical signal 21 outside of the respective passband. In an exemplary arrangement, one or more of the optical modulators is configured to pass one or more wavelength of light different than at least one wavelength of light passed by the others of the optical modulators.

The optical modulators of array 24 are configured to provide appropriate spacing of the desired portions of optical signal 21 from one another. Passbands of the optical modulators are separated by appropriate guard bands to avoid cross-talk or other interference between channels in one embodiment.

In the described optical communication system 10 depicted in FIG. 1, optical signals 23 are provided to respective optical modulators of modulator array 24. Desired portions of the optical signal 21 to be passed and modulated within the respective optical modulators may be substantially provided as respective optical signals 23 as determined within divider 22 and corresponding to the respective passbands of the optical modulators leaving minimal or no filtering of light of the optical signals 23. In such an arrangement, optical divider 22 is configured to divide the optical signal 21 into optical signals 23 substantially comprising the desired portions having wavelengths of light corresponding to the passbands of the respective optical modulators. Alternatively, filtering of light from individual optical signals 23 is implemented by the optical modulators to remove undesired light from optical signals 23. Optical signals modulated and outputted from modulator array 24 have reference 25 in FIG. 1.

In an alternative implementation of optical communication system 10, divider 22 provides no wavelength division but rather divides optical signal 21 into optical signals 23 which individually have substantially the same wavelength spectrum as signal 21. Accordingly, optical signals 23 comprise broad spectrum signals in such an embodiment. Optical modulators of array 24 filter and modulate the broad spectrum signals 23 providing optical signals 25 as described above. In such an arrangement, the optical modulators are configured to filter undesired portions of optical signals 23 outside of the respective passbands of the optical modulators and to pass and to modulate the respective desired portions of optical signals 23.

Data source(s) 12 are configured to provide a plurality of data signals 13 containing information to be communicated within optical communication system 10. Data source(s) 12 are arranged in the described embodiment to provide a plurality of data signals 13 corresponding to the channels within optical communication system 10. For example, the number of data signals 13 corresponds to the number of optical signals 23, 25 within optical communication system 10. The data signals 13 are utilized to modulate the desired portions of optical signal 21 to form optical signals 25. At any given time, one or more of the channels may not be utilized. Other embodiments are possible.

Data source 12 outputs the data signals 13 comprising electrical signals. Exemplary data signals 13 individually have a frequency utilized to control modulation of desired portions of the optical signal 21 using optical modulators of array 24. Exemplary data signals 13 have MHz or GHz frequencies, with the higher frequencies, such as 1–100 GHz for example, providing increased bandwidth compared with the lower frequency signals.

The optical modulators of array 24 have respective filter frequencies. The filter frequencies of the optical modulators of array 24 are different in one exemplary embodiment to provide different communication channels of optical communication systems 10. The passbands of the respective optical modulators of array 24 are designed to be electronically tunable as described below. Accordingly, data signals 13 are utilized to control the electronic tuning of the respective optical modulators 34 to encode the data upon the respective desired portions of optical signal 21 by modulating the filter frequencies and passbands of the respective optical modulators 34 at the data rates of data signals 13.

Modulator array 24 outputs the plurality of modulated desired portions as optical signals 25, also referred to as encoded light-beams, to combiner 26. Combiner 26 is configured to receive the desired modulated optical signals 25 and to combine such signals 25 into an optical signal 27, also referred to as a multiplexed-light beam in at least one embodiment, for communication using optical communication medium 28. In one configuration, combiner 26 is configured to frequency multiplex signals 25 to combine signals 25.

Optical communication medium 28 is implemented in any desired configuration configured to communicate one or more optical signal. Exemplary optical communication media include an optical waveguide comprising one or more optical fiber, air or other appropriate optical transmission medium.

Other arrangements of optical communication system are possible in addition to those described with reference to FIG. 1.

Referring to FIG. 2, one exemplary implementation of optical communication system 10 of FIG. 1 is depicted. Light source 20 is configured as an edge emitting light emitting diode 30 coupled with optical divider 22 implemented as an array waveguide 32. Optical modulator array 24 is coupled with array waveguide 30. Although not shown in FIG. 2, data source 12 supplies desired data signals to optical modulator array 24. Optical combiner 26 is coupled intermediate optical modulator array 24 and optical communication medium 28. Optical communication medium 28 is implemented as a single optical fiber 28 configured to communicate the modulated desired portions of optical signal 21 outputted from array 24 and combined in combiner 26.

Decoding of communication data can be accomplished by one or more standard technique. For example, one decoding technique includes demultiplexing the optical signals at different wavelengths into separate channels and then converting frequency modulation to intensity modulation which can be monitored with an optical detector. Other decoding arrangements may be used.

Referring to FIGS. 3 and 4, an exemplary configuration of optical modulator array 24 is depicted. Modulator 24 comprises a plurality of modulators 34, 34a, 34b, 34c in the depicted embodiment corresponding to four communication channels within optical communication system 10. More or less channels are provided according to other optical communication systems and methodologies of the present invention.

The depicted modulators 34, 34a, 34b, 34c are configured as Fabry-Perot cavities in the described embodiment. Modulators 34, 34a, 34b, 34c are tuned to one or more respective wavelength (i.e., passbands) and are configured to modulate desired portions of optical signal 21 having the respective wavelengths. As described above, modulators 34, 34a, 34b, 34c pass and modulate portions of optical signal 21 within the respective passbands of the modulators. If wavelengths of light outside of the respective pass bands are provided to modulators 34, 34a, 34b, 34c, such light is filtered and not passed according to the exemplary arrangement.

Individual modulators 34, 34a, 34b, 34c include a respective one of cavities 42, 42a, 42b, 42c, electrodes 44, 46, insulators 48 and mirrors 50 as shown. Modulators 34, 34a, 34b, 34c are provided upon a substrate 40 which is transparent to wavelengths of light to be communicated within optical communication system 10 in the described exemplary embodiment. An exemplary substrate 40 comprises silicon. Insulators 48 are provided intermediate electrodes 46 and cavities 42, 42a, 42b, 42c as illustrated and comprise silicon in one example.

Referring specifically to FIG. 4, mirrors 50 are provided upon upper and lower portions of respective cavities 42, 42a, 42b, 42c. Exemplary mirrors 50 in one instance comprise high reflectivity mirrors, such as Bragg mirrors, comprising two or more even number of layers of transparent material having different refractive indices, such as silicon dioxide, titanium oxide or silicon nitride, for example.

In the described embodiment, light from optical signal 21 is received within the upper surfaces of cavities 42, 42a, 42b, 42c and passed through the lower surfaces of the respective cavities and through substrate 40 for application to combiner 26 illustrated in FIG. 1.

Respective data signals 13 (not shown in FIGS. 3 and 4) are provided to electrodes 44, 46 to electronically tune respective cavities 42, 42a, 42b, 42c. Optical path lengths of the modulators 34, 34a, 34b, 34c dictate the frequencies of the respective passbands of the respective modulators. The optical path lengths of modulators 34, 34a, 34b, 34c, are defined by the physical length and refractive indices of cavities 42, 42a, 42b, 42c. Varying the physical length and/or refractive indices varies the passband of the respective modulator 34, 34a, 34b, 34c.

In the described exemplary embodiment, the respective cavities 42, 42a, 42b, 42c have different physical lengths, as illustrated, tuned to the desired portions of optical signal 21 to be passed and modulated. In the described embodiment, cavities 42, 42a, 42b, 42c contain a material having a relatively high electro-optic coefficient. Exemplary materials include electrically controllable birefringent material, such as lithiumniobate, barbarium titanate or other materials including polymer materials having high electro-optic coefficients. Cavities 42, 42a, 42b, 42c contain the same or different birefringent material depending upon the configuration of array 24 and frequencies of light to be modulated.

The material(s) within cavities 42, 42a, 42b, 42c may be varied to further tune optical modulators 32, 32a, 32b, 32c to the desired passbands. In such an arrangement, the physical length of cavities 42, 42a, 42b, 42 may be held constant or varied depending upon the desired configuration and desired passbands. In general, the effective cavity length may be shorter if distributed Bragg mirrors are utilized as mirrors 50 inasmuch as mirror thickness can be a reasonable fraction of overall cavity length.

Data signals 13 applied to the electrodes 44, 46 vary the refractive indices of the birefringent material in cavities 42, 42a, 42b, 42c providing modulation of the filter frequencies of modulators 34, 34a, 34b, 34c and modulation of the desired portions of optical signal 21 passing therethrough. The wavelengths or frequencies of the desired portions of the optical signal 21 are modulated within modulators 34, 34a, 34b, 34c responsive to the varying of the refractive indices of materials within cavities 42, 42a, 42b, 42c.

As described, the present invention provides improved devices and methods for encoding data on an optical signal. In one example of the invention, frequency modulation obtained by modulation of a filter illuminated with a broadband source provides signal bandwidths which are limited by the response of the tunable filter which can be much faster than the bandwidth of a laser which is limited by capacitance and carrier dynamics. Accordingly, aspects of the invention provide usage of a bright, broad spectrum incoherent optical source together with high speed tunable filters to achieve high data rate transmission over a broad range of operating temperatures. Other aspects are provided as described above.

What is claimed is:

1. A method of optical communication comprising:
providing a plurality of optical signals;
providing a plurality of data signals;

providing a plurality of optical modulators, each of the plurality of optical modulators:
receiving one of the plurality of optical signals and one of the plurality of data signals;
passing a desired portion of the received optical signal, the passed desired portion of the received optical signal having at least one predefined wavelength;
optically modulating the passed desired portion of the received optical signal responsive to the received data signal to provide an optically modulated passed desired portion of the received optical signal; and
outputting the optically modulated passed desired portion of the received optical signal to an optical communication medium.

2. The method of claim 1 wherein optically modulating the passed desired portion of the optical signal comprises frequency modulating the passed desired portion of the optical signal.

3. The method of claim 1 wherein the at least one predefined wavelength is different from the at least one predefined wavelength of desired portions of optical signals passed by others of the plurality of optical modulators.

4. The method of claim 1 wherein each of the plurality of optical modulators has a different pass band, and wherein the passing and the optically modulating comprise passing and optically modulating the desired portion of the optical signal within the pass band of the optical modulator and not passing and not optically modulating other portions of the optical signal outside of the pass band.

5. The method of claim 4 further comprising filtering the other portions of the optical signal using the optical modulator.

6. The method of claim 1 wherein providing a plurality of optical signals comprises:
dividing a source optical signal into the plurality of optical signals.

7. The method of claim 1 further comprising combining the optically modulated passed desired portion of the optical signal of each of the plurality of optical modulators before the outputting, wherein the optical communication medium comprises an optical fiber.

8. The method of claim 1 wherein the plurality of optical signals have different wavelengths.

9. The method of claim 1 wherein the plurality of optical signals have the same wavelengths.

10. A method of optical communication comprising:
providing an optical signal;
providing a data signal;
receiving the optical signal and the data signal within an optical modulator;
encoding the data signal upon at least portion of the optical signal by optically modulating at least the portion of the optical signal using frequency modulation; and
outputting at least the portion of the optical signal to an optical communication medium after the encoding, wherein the optical modulator comprises a filter having a pass band, and wherein the encoding comprises frequency modulating at least the portion of the optical signal within the pass band.

11. The method of claim 10 further comprising filtering other portions of the optical signal outside of the pass band using the optical modulator.

12. The method of claim 10, wherein the receiving comprises receiving at least the portion of the optical signal within an optical modulator having a filter frequency, and the encoding comprises frequency modulating the filter frequency.

13. An optical communications method comprising:
dividing a source-light beam into plural carrier-light beams;
modulating said carrier-light beams responsive to respective data signals to yield plural encoded-light beams, wherein said encoded light beams have different respective encoded-light wavelengths; and
combining said encoded-light beams to yield a multiplexed-light beam, wherein said combining step comprises frequency-multiplexing said encoded light beams.

14. The method of claim 13 further comprising injecting said multiplexed-light beam into an optical communication channel.

15. The method of claim 13 wherein said carrier-light beams share a common carrier wavelength.

16. The method of claim 13 wherein said carrier-light beams have different respective carrier-light wavelengths.

17. The method of claim 16 wherein each carrier-light wavelength of a respective carrier-light beam is closer to the encoded-light wavelength of the respective encoded-light beam that to the encoded-light wavelength of any other of said encoded-light beams.

18. An optical communication system comprising:
a plurality of optical modulators adapted to optically couple with a plurality of optical signals and an optical communication medium, wherein each of the plurality of optical modulators are configured to:
receive a data signal;
pass a desired portion of the coupled optical signal, the desired portion having at least one predefined wavelength;
optically modulate the passed desired portion of the coupled optical signal having the at least one predefined wavelength responsive to the received data signal to provide an optically modulated passed desired portion of the coupled optical signal; and
output the optically modulated passed desired portion of the coupled optical signal for application to the optical communication medium.

19. The system of claim 18 wherein the optical modulators are configured to frequency modulate the desired portions of the coupled optical signal.

20. The system of claim 18 wherein the optical modulators are configured to pass the desired portions of the coupled optical signal having respective different wavelengths.

21. The system of claim 18 wherein the optical modulators have respective different pass bands, and the optical modulators are configured to pass and to modulate the desired portions of the coupled optical signal within the respective pass bands and to not pass and to not modulate other portions of the coupled optical signal outside of the respective pass bands.

22. The system of claim 21 wherein the optical modulators are configured to filter the other portions of the coupled optical signal.

23. The system of claim 18 further comprising a divider configured to divide a source optical signal into the plurality of coupled optical signals.

24. The system of claim 18 further comprising a combiner configured to receive the optically modulated passed desired portions of the coupled optical signal from the optical modulators, to combine the optically modulated passed desired portions, and to provide the optically modulated passed desired portions to the optical communication medium, wherein the optical communication medium comprises an optical fiber.

25. The system of claim 18 wherein the plurality of optical signals have different wavelengths.

26. The system of claim 18 wherein the plurality of optical signals have the same wavelengths.

27. An optical communication system comprising:
a light source for providing a source-light beam;
an optical divider for converting said source-light beam into plural carrier-light beams;
a modulator array for converting said carrier-light beams into encoded-light beams, said modulator including means for receiving plural data signals, said modulator array converting each of said carrier-light beams into a respective one of said encoded-light beams as a function of a respective one of said data signals, wherein each of said encoded-light beams has a respective encoded-light wavelength, no two of said encoded-light beams having the same encoded-light wavelength; and
an optical combiner for combining said encoded-light beams to yield a multiplexed light beam, said optical combiner frequency multiplexing said encoded-light beams to yield said multiplexed-light beam.

28. The system of claim 27 wherein said optical combiner injects said multiplexed-light beam into an optical communications channel.

29. The system of claim 27 wherein said carrier-light beams share a common carrier-light wavelength.

30. The system of claim 27 wherein said plural carrier-light beams have respective carrier-light wavelengths, no two of said carrier-light beams having the same carrier-light wavelengths.

31. The system of claim 30 wherein the carrier-light wavelength for each of said carrier-light beams is closer to the encoded-light wavelength of the respective encoded-light beam than to the encoded-light wavelength of any other encoded-light beam.

* * * * *

UNITED STATES PATENT AND TRADEMARK OFFICE
CERTIFICATE OF CORRECTION

PATENT NO. : 7,110,675 B2
APPLICATION NO. : 09/961119
DATED : September 19, 2006
INVENTOR(S) : Kent W. Carey It is certified that error appears in the above-identified patent and that said Letters Patent is hereby corrected as shown below:

Title Page, Column 2, (Other Publications), Line 4, delete "th eFrequency" and insert -- the Frequency --;

Column 8, Line 25, Claim 17, delete "that" and insert -- than --.

Signed and Sealed this

Twenty-sixth Day of October, 2010

David J. Kappos
*Director of the United States Patent and Trademark Office*